United States Patent
Fitton et al.

(10) Patent No.: US 7,342,954 B2
(45) Date of Patent: Mar. 11, 2008

(54) ADAPTIVE MODULATION FOR WIRELESS NETWORKS

(75) Inventors: Michael Philip Fitton, Bristol (GB); Rafael Arcangel Cepeda Lopez, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 740 days.

(21) Appl. No.: 10/372,311

(22) Filed: Feb. 25, 2003

(65) Prior Publication Data

US 2004/0004998 A1    Jan. 8, 2004

(30) Foreign Application Priority Data

Feb. 25, 2002    (GB)    ................................. 0204325.5

(51) Int. Cl.
*H04B 1/38*    (2006.01)
*H04L 5/16*    (2006.01)

(52) U.S. Cl. ...................... 375/219; 375/232; 375/342; 375/261; 375/130; 375/222; 370/286; 370/287

(58) Field of Classification Search ................ 375/219, 375/232, 342, 261, 130, 222; 370/286–287
See application file for complete search history.

(56) References Cited

U.S. PATENT DOCUMENTS

| | | | |
|---|---|---|---|
| 5,654,667 A * | 8/1997 | Adachi | ........................ 329/306 |
| 6,097,768 A * | 8/2000 | Janesch et al. | ............. 375/330 |
| 6,542,736 B1 * | 4/2003 | Parkvall et al. | .......... 455/452.2 |
| 6,567,475 B1 * | 5/2003 | Dent et al. | ................... 375/286 |
| 6,760,882 B1 * | 7/2004 | Gesbert et al. | ............. 714/774 |
| 6,865,393 B1 * | 3/2005 | Baum et al. | ............. 455/452.2 |
| 2002/0056066 A1 * | 5/2002 | Gesbert et al. | ............. 714/759 |
| 2005/0075078 A1 * | 4/2005 | Makinen et al. | ......... 455/67.15 |

OTHER PUBLICATIONS

D. Makrakis and K. Feher, "Optimal noncoherent detection of PSK signals," Electron. Lett., vol. 26, pp. 398-400, Mar. 15, 1990.*

* cited by examiner

*Primary Examiner*—David C. Payne
*Assistant Examiner*—Nader Bolourchi
(74) *Attorney, Agent, or Firm*—Oblon, Spivak, McClelland, Maier & Neustadt, P.C.

(57) ABSTRACT

The invention relates to communication between terminals. Where communication is over an ideal channel then a high throughput modulation scheme can be used. Where the terminals suffer interference or noise, transmission can be modified to a more robust modulation scheme. The modulation scheme for a signal to be transmitted from the terminal is normally selected based up measurements made on a signal received by the terminal. However, the uplink and downlink between two terminals may not be experiencing the same interference and noise. For example, an interfering source may affect one terminal more than another. Under these circumstances, the terminal will not get a good picture of the status of the channel or link over which it is about to transmit. Therefore, the invention provides a system where quality information is passed from the terminal receiving a signal to the terminal which sent the signal to help to determine the most appropriate modulation scheme.

37 Claims, 8 Drawing Sheets

ADAPTIVE MODULATION FOR WIRELESS NETWORKS

FIELD OF THE INVENTION

The present invention relates to the selection and control of the modulation scheme used in a communication channel between two terminals.

BACKGROUND OF THE INVENTION

When two terminals are communicating with each other, the selection of the modulation scheme used for the communication channels can significantly affect the throughput of that channel and also the ability of the channel to reject noise on the link, whether that be wireless or otherwise. In particular, it may be advantageous to use a modulation scheme which has a high throughput rate but with little error correction when the quality of the channel is good and, in contrast, a modulation scheme which has good resistance to noise albeit with lower throughput where the channel suffers noise or interference. The difficulty in selecting the appropriate modulation scheme comes about where the environment is variable such that in one instance, the noise may be very low but in another instance very high. Under these circumstances, the most reliable and noise resistant modulation technique must be used. However, this means that in those instances where the noise is low, the throughput is unnecessarily low.

Therefore, it is desirable to provide the ability to vary the modulation technique according to the current characteristics of a channel. In this way, if the channel is determined to be relatively free of the noise and interference then a modulation scheme with a high throughput can be used. Subsequently, if the noise or interference on the channel increases such that the current modulation scheme is unable to sustain reliable data transfer then the modulation scheme can be adapted to a more noise resistant modulation scheme.

However, this approach relies upon the respective transmit and receive links, referred to herein as the uplink and the downlink, between two terminals being subjected to similar interference or other factors such as noise. If there is a significant difference in the interference suffered by the uplink and downlink, considerable degradation of the throughput can occur. For example, in FIG. 1, two terminals A and B have a communication link formed between them. A source of interference I will affect the signals received by A and B. If, as shown in FIG. 1, the interfering source I is located centrally between the two terminals then the interference will have a similar effect on the signal received at both terminals. However, if the interference source moves (see FIG. 2) such that the interference received by one of the terminals, in this case B, is greater than that received at the other terminal then the interfering signal will affect the uplink more than the downlink. Consequently, unless the modulation scheme is very robust, the signal received by terminal B will include more errors. This may cause terminal B to determine that the signal path is significantly degraded and so switch to a more robust modulation scheme. However, the downlink, i.e. to terminal A, is still perfectly capable of supporting the previous modulation scheme. In fact, because the interferer has moved away from terminal A, the interfering signal has less of an effect on the signal received by A and so it may even be possible to switch to a different modulation scheme having a higher throughput.

The main disadvantage of the approach currently used, is that when applying adaptive modulation over a link conformed by up and down links, the response of the system can be severely deteriorated when not considering the differences that can occur between the links.

SUMMARY OF THE INVENTION

Therefore according to the present invention there is provided a communication terminal comprising: a receiver for receiving a signal from a sender terminal; a signal analyser for determining one or more quality parameters of the received signal; an adaptation information generator for producing adaptation information based upon said signal quality parameters; and a transmitter for transmitting data, wherein said data includes the adaptation information.

The present invention preferably includes a modulation scheme adapter responsive to received adaptation information included in said received signal, for determining a modulation scheme for transmission of data from the terminal; and modulation means for modulating said data according to the determined modulation scheme prior to transmission.

The present invention further provides a communication terminal comprising: a receiver for receiving a signal from a sender terminal; a modulation scheme adapter responsive to received adaptation information included in said received signal, for determining a modulation scheme for transmission of data from the terminal; modulation means for modulating said data according to the determined modulation scheme; and a transmitter for transmitting said modulated data.

The present invention further provides a method of communication comprising: receiving a signal; determining one or more quality parameters of the received signal; generating adaptation information based upon said signal quality parameters; and transmitting signal data.

Adaptation at the transmitter using individual knowledge of the channels can be implemented by using information provided by the automatic repeat request (ARQ), but the time required for collecting enough information before adapting can be very long.

The present invention preferably utilises a simple communication method to send adaptation information, for determining the most appropriate modulation scheme, from one terminal to the other. In this way, the data overhead is minimal and may be inserted in existing unused header bits. Therefore, the response time is maximised as the information is transferred rapidly to the other terminal.

With the present invention, different modulation schemes can be used for each terminal at the same time when the channels do not present reciprocal characteristics. The adaptation process is fast and will not incur delays or involve complicated calculation. Change in thresholds for adaptation according to specific quality of service can be implemented at upper layers. This gives the controlling application the opportunity of manipulating the fed back information in order to achieve the throughput it requires.

In the system of the present invention, it is possible to analyse only the bit from the last received packet in conjunction with its predecessor (earlier bits can be discarded after adaptation or one by one after packet reception), thus taking advantage of the fast fading characteristics of the channel.

The proposed system can overcome problems of the conventional system, as the process of adaptation will be decided in a time corresponding to the chosen number of consecutive packets. The received information will include the estimation of the throughput performance at the other terminal, giving the best possible interpretation of the link in both directions in a fast feedback approach.

The present invention can be implemented either in hardware or on software in a programmable processor or computer. Further the present invention can be implemented in a combination of hardware and software. The present invention can also be implemented by a single processing apparatus or a distributed network of processing apparatuses.

Since the present invention can be implemented by software, the present invention encompasses computer code provided to a programmable processor or computer on any suitable carrier medium. The carrier medium can comprise any storage medium such as a floppy disk, a CD ROM, a magnetic device or a programmable or read-only memory device, or any transient medium such as any signal e.g. an electrical, optical or microwave signal.

BRIEF DESCRIPTION OFF THE DRAWINGS

There now follows a description of a specific embodiment of the present invention in which.

DETAILED DESCRIPTION

This embodiment of the present invention is described in relation to two terminals, terminals A and B, communicating with each other over two communication links referred to herein as the uplink and the downlink. For consistency, the transmission of data from terminal A to terminal B will be on the uplink and the transmission of data from terminal B to terminal A will be on the downlink.

Figure 1:
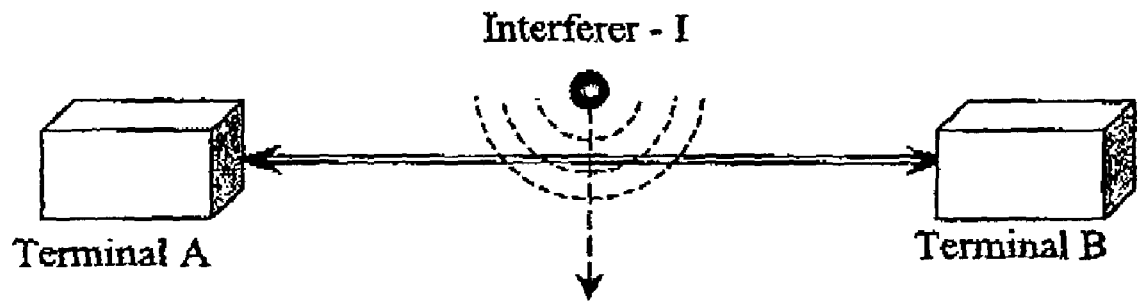
FIG. 1 shows a typical arrangement of two transceivers suffering interference.
Figure 3:
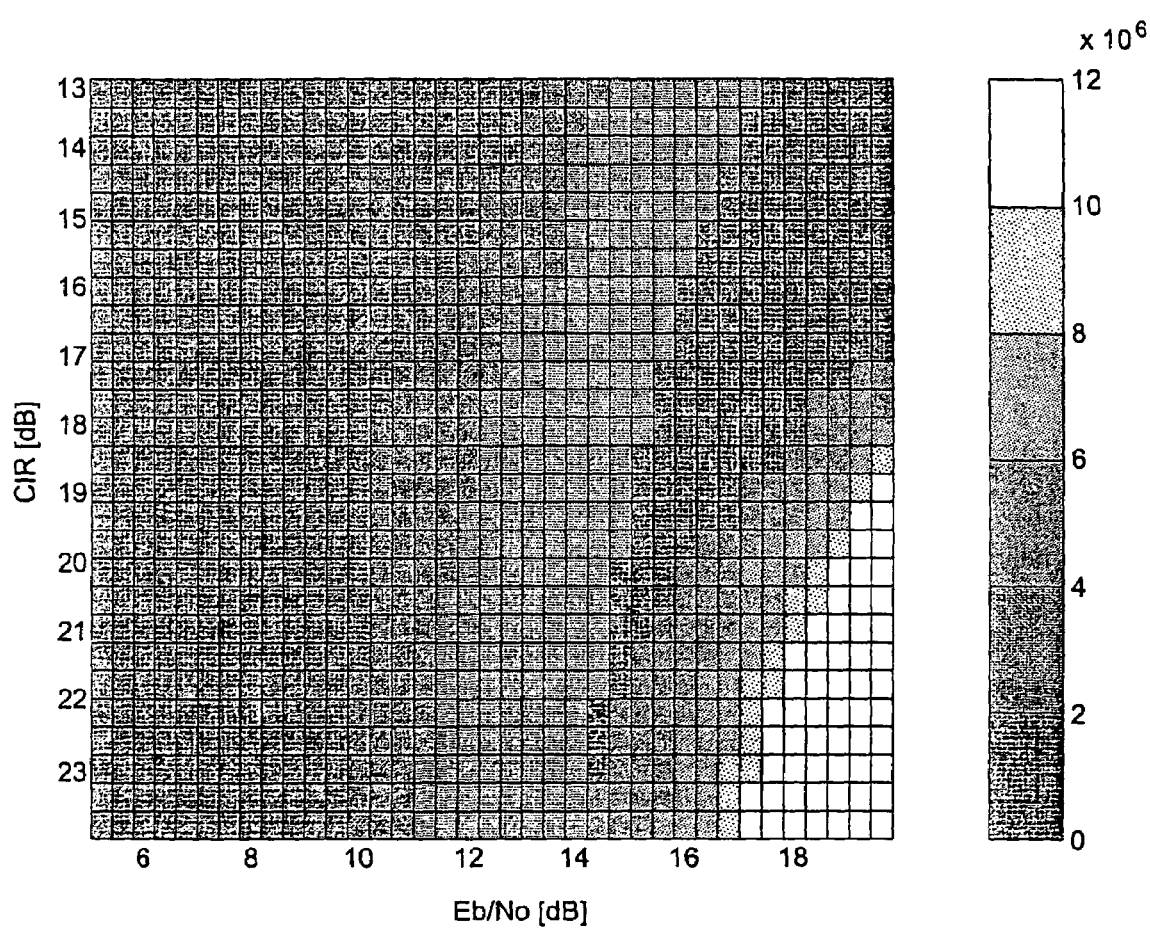
FIG. 3 shows throughput for a channel under different channel conditions.

FIG. 3 shows a representation of the throughput of data on a link between two terminals under different noise and interference conditions. In the arrangement shown in FIG. 1, terminals A and B communicate with each other with an interference source affecting the links therebetween. Noise will also affect the channels. FIG. 3 shows the effect on the throughput of one of these links depending upon the level of the interference, i.e. the channel to interference ratio (CIR), and the bit energy to noise density ratio ($E_b/N_o$) referred to hereinafter as the energy to noise ratio.

In this example, there is no feedback of information from the receiver terminal and so the determination of the modulation scheme to use for the next transmission is based upon the received signal strength indication (RSSI) and also on the segment error rate (SER) of the last transmission received from the other terminal. In this way, where the interference is low, the error rate is primarily dependent upon the energy to noise ratio as measured by the RSSI. In this way, as the noise increases, the system will progressively switch to a more robust modulation schemes.

Where the CIR is high, such that there is relatively little channel interference, and the bit energy to noise ratio is high then the link quality will also be high and throughput will be good. This situation is represented by the bottom right-hand corner of the graph shown in FIG. 3. Under these conditions, the modulation scheme can be selected as one with a high throughput rather than one which is very robust because the channel quality is good. As the energy to noise ratio decreases, the high rate modulation scheme cannot be maintained and the system must progressively switch down to ever more robust modulation schemes. This represents moving along the bottom of the graph from right to left.

The above discussion assumes that the channel to interference ratio CIR is relatively large, i.e. relatively little interference. Consequently, by monitoring the incoming signal, each terminal is provided with a good indication of the quality of the channel over which it is transmitting. The detected quality of the received channel, provides a good indication of the modulation scheme which is most suitable for the transmission channel. Whilst the interference is small and affecting both channels equally, this system will work well because the metrics used to determine the quality of the receive channel (uplink) provide a good indication of quality of the transmit channel (downlink) and therefore the most appropriate modulation scheme.

However, as the channel interference increases it has a more significant affect on the throughput and more importantly as it begins to affect one channel more than another, perhaps because the interferer gets closer to one terminal and further away from the other, the effect of the interference on the two channels is different. Under these circumstances, using the metrics derived from the uplink ceases to provide a good indication of the quality of the downlink and therefore provides a poor indication of the appropriate modulation scheme.

The most difficult scenario is when a link is exposed to interference with 0 Hz shifting in frequency relative to the desired signal. The examples given here are based upon this type of interference.

In FIG. 3, the top left corner of the graph represents channels with low energy to noise ratio and low channel to interference ratio. Consequently, at this point the throughput is negligible because even with the most robust modulation scheme, the data is failing to be received correctly. As the energy to noise ratio increases (represented by moving along the top of the graph from left to right), data starts to be successfully received and the throughput starts to increase. The throughput progressively increases as the energy to noise ratio increases. However, as the energy to noise ratio becomes better, the RSSI increases and the SER starts to reduce. At this point, the terminal determines to change the modulation scheme to a scheme with a higher throughput because the robustness of the current modulation scheme is not required.

As the energy to noise density progressively increases, terminal A will switch to the next better modulation scheme. However, the channel still has relatively high interference (low CIR) and so is not yet sufficient to support that modulation scheme. The error rate, measured by the SER, will be much higher at the receiver terminal (B) of the signal.

Terminal B will therefore determine that a more robust modulation scheme should be used. As a consequence of this, the signal transmitted from A with the modulation scheme having higher throughput does not achieve the potential higher throughput because of the increased number of errors. In addition, terminal B may then transmit using a more robust modulation scheme which may in fact be more robust than necessary resulting in a further reduction in throughput.

Terminal B then transmits using the more robust transmission scheme and because of the existing conditions, the data is transmitted with few errors and so the SER at A is high. Terminal A therefore determines that the channels are suffering little deterioration and therefore continues to use the higher throughput modulation scheme. This cycle continues whilst the conditions remain the same. As a result, the overall throughput is actually worse than is achieved where the energy to density ratio is poorer because of the switching between the modulation scheme which is not quite sufficient for the conditions and a scheme which is too conservative for the condition.

As the CIR increases (moving further to the right along the top of the graph in FIG. 3), the conditions become appropriate to support the modulation scheme with a higher throughput and so unproved throughput is realised. As the CIR continues to improve, the condition described above begins to occur again. The system metrics begin to indicate that a potentially better modulation scheme could be used and so one of the terminals switches to that higher throughput modulation scheme. However, the conditions are not yet sufficient to support that modulation scheme and data is corrupted in transit. Consequently, the terminal receiving that signal transmits using a more robust modulation scheme further reducing the throughput so that again there is a region of reduced throughput even though the CIR has improved.

The above example considers the situation where the interference is the same for both channels. However, if the interference level changes, for example if the interferer moves closer to one terminal than to the other then the interference at that terminal will be greater whilst the interference at the other terminal will be less. Differences in the level of interference experienced may also occur for different reasons, for example because one terminal is shielded by a building.

Figure 2:
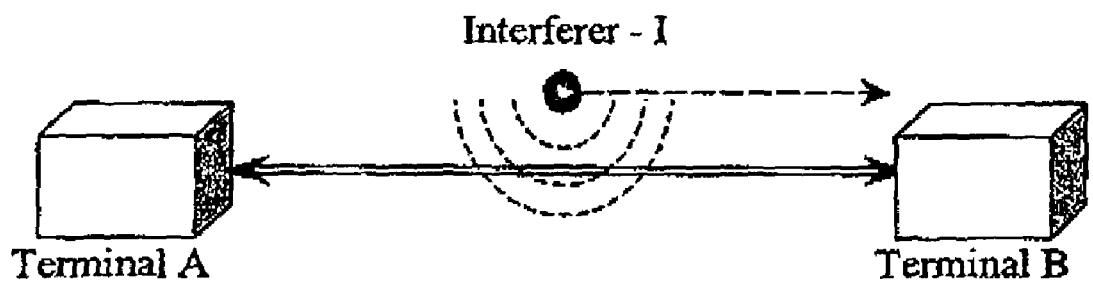
FIG. 2 shows the interference source moving closer to one terminal.
Figure 4A:
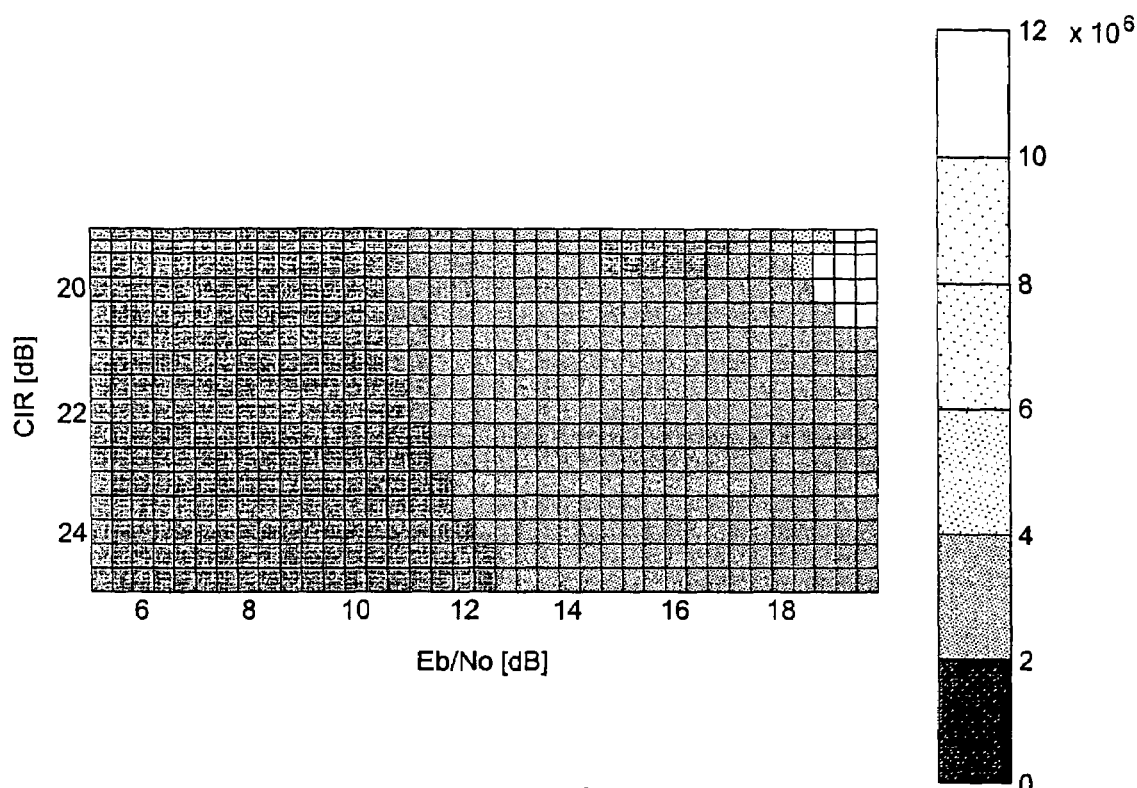
FIGS. 4A and 4B show throughput for respective channels as interference increases in one channel and decreases in the other.
Figure 4B:
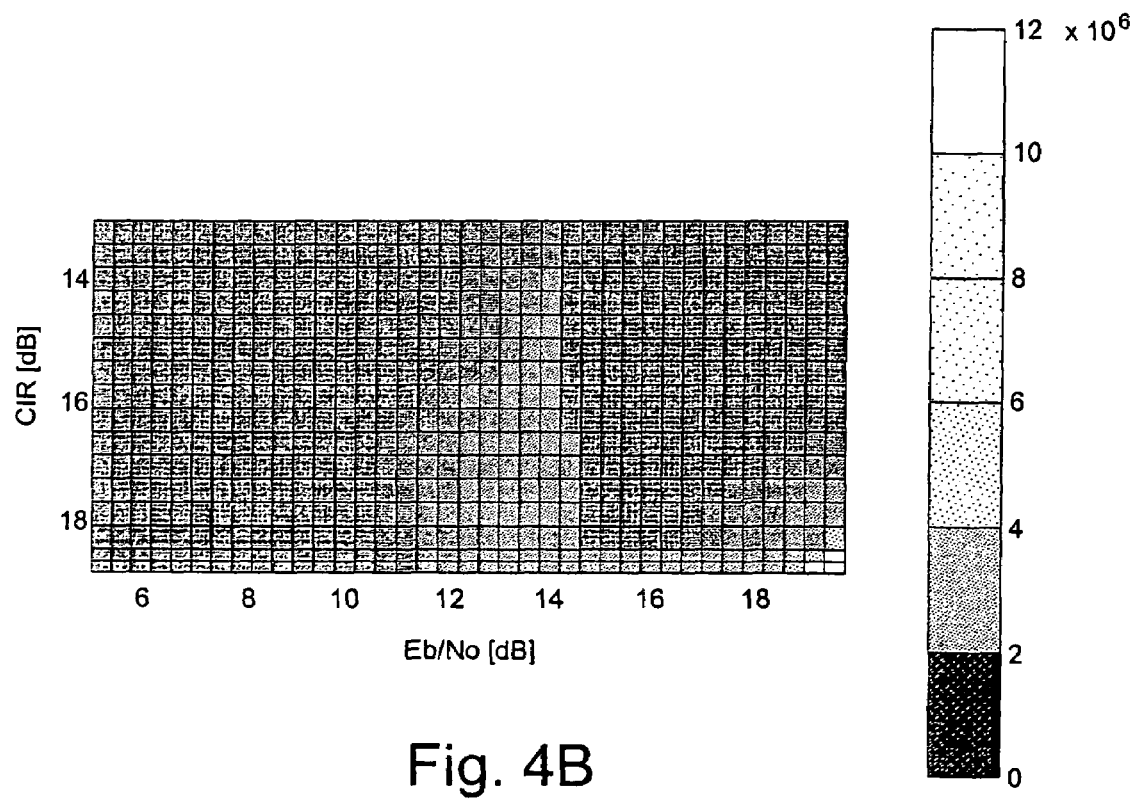

FIGS. 4A and 4B show the throughput between two terminals, A & B under the conditions shown in FIG. 2, i.e. differing interference. The figures show how the throughput varies as the interference increases in the signal received by terminal B and reduces in the signal received by terminal A. It is assumed that the CIR is initially 19 for both links but decreases progressively in one link whilst increasing by a corresponding amount in the other link. Thus FIGS. 4A and 4B show the throughput for the two channels separately but assume that the CIR is linked as described above (e.g. CIR=22 at one terminal and 16 at the other).

FIG. 4A represents the throughput to terminal A, i.e. the channel in which the interference is reducing. In the top right-hand corner, the interference is substantially the same in both channels and since the energy to noise ratio is high, the modulation schemes being used are high throughput schemes allowing an overall high throughput to terminal A. The situation in the corresponding channel is shown in FIG. 4B, represented in the bottom right-hand corner. As would be expected, for channels under identical conditions, the throughput is similar. As the CIR begins to become different for the two channels, the throughput begins to drop away in both channels, Looking at FIG. 4A, as the CIR increases the throughput actually reduces. Although the amount of interference received by terminal A is reducing such that there are fewer errors in the received signal, the modulation scheme (determined by terminal B) is switched to a more robust scheme because terminal B is receiving more erroneous data packets due to the increased interference experienced by terminal B. Therefore terminal B determines that the channels between the two terminals are suffering increased interference.

Referring to FIG. 4B, as the interference increases in the signal received by terminal B, the number of packet errors increases. However, because terminal A is receiving less interference, it determines that the channel quality is good and so continues to send data using a high throughput modulation scheme. Because such a modulation scheme is not robust enough to deal with the amount of interference received at terminal B then the packets cannot be recovered. This results in a rapid decrease in the throughput of the channel such that very quickly the throughput falls to zero (see top right corner of FIG. 4B). Any further increase in the interference simply makes the situation worse. From FIG. 4A, it will be apparent that as the amount of noise increases, the energy to noise ratio decreases. In FIG. 4A, this results in the throughput progressively decreasing (from right to left). The determination of the modulation scheme is based upon the seament error rate (SER) and the RSSI. So where the interference is very low, the main controlling factor in determining the modulation scheme at terminal A is the value of RSSI based upon the energy to noise ratio.

In FIG. 4B, the effect of the reduction in the energy to noise ratio is more complicated. Apart from the small peak in the bottom right-hand corner of the graph (explained above), the throughput is effectively zero where the energy to noise ratio is high. As the energy to noise ratio begins to fall away, the throughput suddenly rises (around the $E_b/N_o$ 14 region). The reason for this is that the noise level has fallen to a level where the terminal A now determines that the noise on the signals received is sufficiently high to justify reducing the modulation scheme to a more robust scheme even if there is little interference. Again, because the interference is smaller at terminal A, this terminal may still be receiving relatively few erroneous packets which is why it had previously used a high throughput modulation scheme. Now, that the modulation scheme is more robust, the channel is more able to handle the effect of the interference and so data is now able to be recovered by the terminal B and throughput is improved. As the energy to noise ratio continues to decrease, the throughput progressively reduces as the number of erroneous packets starts to increase again due to the inability of the modulation scheme to deal with the increased noise. Near the bottom of the graph of FIG. 4B where the interference is relatively small, the throughput drops relatively smoothly. However, where the interference is higher near the top of the graph, there is a further trough where the throughput falls almost to zero again. The reasons for this trough are similar to the large trough in the top right-hand part of the graph.

As explained above, at terminal A, the noise had increased and so the modulation scheme has been reduced to a more robust scheme. However, because terminal A does not receive much interference, it receives very few data packets which include errors. Thus, terminal A does not reduce the modulation scheme to an even more robust scheme as the noise increases at terminal B and so the modulation scheme is unable to cope with the progressively increasing noise causing more and more packets to fail due to the inability of the modulation scheme to be able to recover packets affected. Eventually, as the noise level increases, the throughput again increases because terminal A now determines that the noise level is such that it is necessary to switch to an even more robust modulation scheme. Therefore as before, the modulation scheme is now able to deal with the larger amount of interference and noise experienced by terminal B and so data starts to come through again. This explains the increase in throughput just to the left of the trough at the top of the chart in FIG. 4B (around the 10 dB level). As the noise increases further, the throughput again drops away finally to a level where the noise is so significant that no data is passed by the channel successfully by either channel.

There is now described an arrangement for dealing with this difference in the interference, noise, etc. affecting the received signals at each terminal.

The examples above rely upon the received signal strength indication (RSSI) and the segment failure or segment error rate (SER) of the received signal to determine the modulation scheme for the next transmission. These are implicit measures, i.e. they imply the quality of the transmit channel from the quality of the received channel. The present invention provides an explicit system. In an explicit system metrics about the received channel are fed back to the transfer to allow the transmitter to correct the modulation scheme to be determined.

In this way, when a signal is received by terminal B from terminal A, signal quality metrics are determined and sent back to terminal A in the next transmission by terminal B. In this way terminal A gets an accurate picture of the quality of the uplink rather than implying this form the downlink.

There are several other indicators or metrics which can be used to provide an indication of the quality of a transmission channel. These include Automatic Repeat reQuest (ARQ); carrier to inference (C/I) indication; carrier only indication; interference only indication; application specific indicators of quality of service; and a combination of one or more of the above.

ARQ is a numeric field in the header of a packet of transmitted data indicating an initial error location followed by a binary map for the next segments (where 1 indicates erroneous information and 0 stands for properly received data). This is the mechanism used for data retransmission requests in Bluetooth high rate. When using this metric, a long time for averaging the data is needed as only few bits can be analysed per packet. Another inconvenience of this metric is that once all the segments have been received correctly, this field of data is used with a specific code number followed by ones with the aim of asking for more data If this information is used for adapting, the system will require extra analysis of the data as the position of the segments must be checked in order to avoid it to be interpreted as a burst of errors and force an adaptation to a lower level of modulation.

The information contained in a packet of data is divided into segments, the averaged number of erroneous segments received SER by a terminal can be the metric for adaptation in modulation prior to transmission. Measuring the Segment Error Rate (SER) of the incoming signal only reflects the characteristics of the incoming link but does not give any information about the outgoing link. In other words it has to be assumed that both links are reciprocal. However, this does provide a good indicator of quality and so if the information can be fed back to the transmitter of an incoming signal, a good adaptation indicator is provided.

In order to achieve a better interpretation of the incoming signal, Interference/Carrier power measurements can be done by measuring the RSSI at the receiver before sending data (i.e. in the guard period between packets) and during transmission. This information can be referred to as ISSI (Interference Signal Strength Indication) and can be obtained by subtracting the data for the previous transmission from the corresponding value during transmission. For instance, in the presence of interference, the terminal receiving information performs a measurement of the energy or signal strength present in the channel prior to the expected transmission. Once this information is known and the corresponding transmitter starts sending data, a new measurement of the received signal strength is performed. This allows the receiver to determine a more precise RSSI value to be compared against the given metric used for adapting modulation. Since the interference component can be subtracted from the total power measured upon transmission adaptation can be prevented where conditions are not optimum for doing so (i.e. avoidance of adaptation in the shadowed region in FIG. 6).

The present invention provides a system which will inform the transmitter about the conditions of signals it has transmitted as they are received at the receiver. The metrics above are useful for determining the modulation scheme but they must be sent to the source of the signal upon which they are based to be useful. In the following arrangement, the metrics are used to determine simple adaptation information and send the adaptation information back to the transmitter. In other words rather than sending some or all of the metrics back to the sender to determine its modulation scheme, the receiver carries out analysis of the metrics and sends a simplified set of adaptation information which may be a simple bit stream or a combination of this with a reduced subset of the metrics.

In this embodiment, the header includes a single bit in each header to provide information about the quality of the received signal. This information is sent by using an unused bit allocated in the information packet's header.

Figure 10:
FIG. 10 is a schematic of a data packet of the present invention.

For example, as illustrated in FIG. 10, a packet header contains information regarding addressing, information for the ARQ scheme, and information (e.g., data) about the payload. The total length is 88 bits. The header is transmitted using the DBPSK modulation scheme. Table 1 lists the header fields, their size in bits, and their meaning. The packet header transmission is done in the order indicated in Table 1, starting with HR_ID and ending with H_CRC. Each field is transmitted with LSB fist.

| Field | Size | Meaning |
| --- | --- | --- |
| HR_ID | 8 | High Rate channel ID |
| DP_ADDR | 8 | Destination point address field |
| SP_ADDR | 8 | Source point address field |
| MOD_TYPE | 2 | Modulation type |
| FEC_ON | 1 | FEC applied |
| Reserved | 1 | For future use |
| PKT_SAR | 2 | Packet type |
| MN | 2 | Message number |
| RN | 8 | Request number |
| SN_BM | 8 | Segment error bit map |
| P_L | 12 | Payload length in bytes |
| XTD_HDR | 2 | Extended Header |

-continued

| Field | Size | Meaning |
|---|---|---|
| ACK_REQ | 1 | Acknowledgement Request |
| Adaptation | 1 | Adaptation in Modulation |
| H_CRC | 24 | Header CRC |

The payload is divided into segments. Each segment is numbered with a 1 byte (8-bit) sequence number SN and contains a 3 byte (24-bit) CRC to detect errors. The user information field contains 128 bytes (1024 bits) per segment. The last segment of the payload can be partially filled with user information varying from 1 to 128 bytes. In the above example, the adaptation information is included in the $14^{th}$ slot but it could be included in the $6^{th}$ slot which is also free for future use.

At the transmitter, a packet is received and the adaptation information bit is extracted. The value of this bit is then averaged over two or more packets to provide m indication of whether or not to change the modulation scheme or maintain the modulation scheme used during the previous transmission from the terminal.

In a basic system, the adaptation information bit from each of two consecutive transmissions are added together. If the sum of two consecutive bits is two then the terminal determines that it should change to a higher modulation scheme (i.e. a scheme with greater throughput). If the sum of the two bits is one then the terminal will remain transmitting using the modulation scheme used for the previous transmission. Finally, if the sum of the two bits is zero then the terminal will determine that it should change over to a lower modulation scheme (i.e. one, which has a lower throughput but is more robust).

With this simple arrangement, only one bit is transmitted per packet and only the last received bit and its predecessor are used to determine whether or not to change to a different modulation scheme. This provides a very simple system which is also very responsive to changes in the environment, which is especially useful in a channel which has fast fading characteristics.

Figure 5:
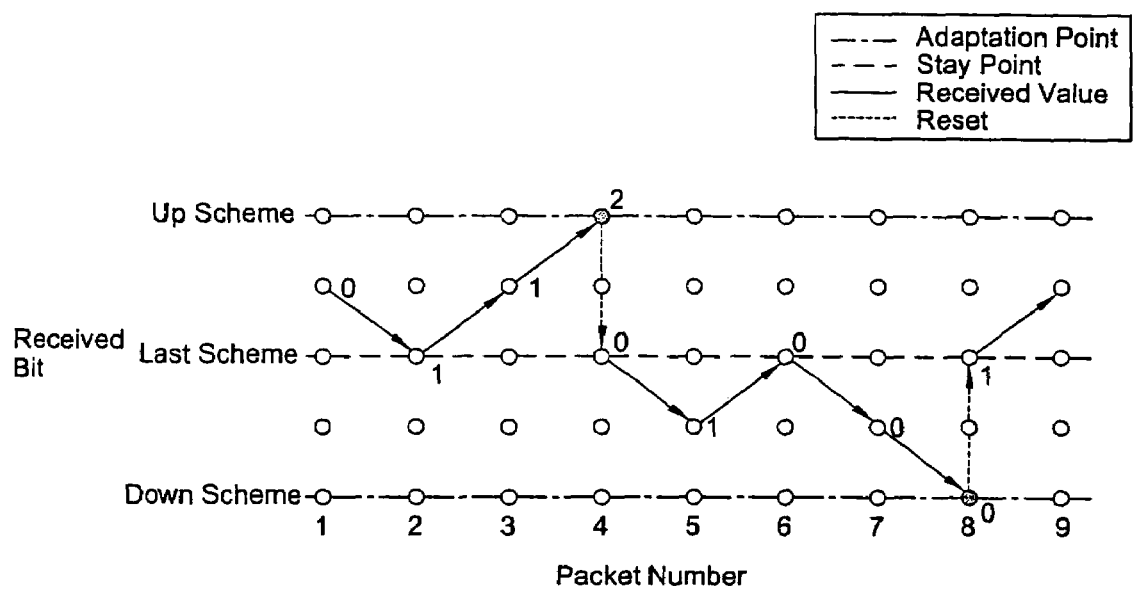
FIG. 5 shows how the adaptation point is determined.
Figure 9:
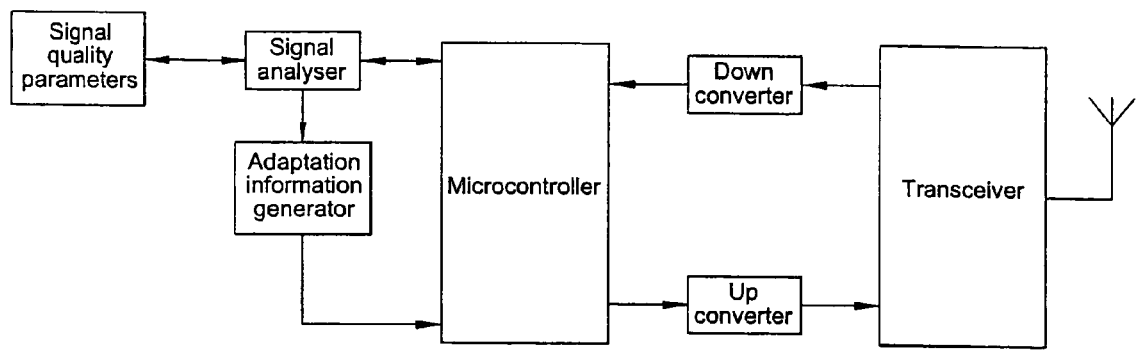
FIG. 9 is a schematic of a general purpose transceiver of the present invention.

FIG. 5 shows how the received adaptation information bit is processed at the terminal. From the initial point, packet 1 is received in which the adaptation information bit is '0'. The transmitter therefore continues to use the modulation scheme used previously. Where the adaptation bit is '1' it is indicated by the arrow pointing generally upwards in FIG. 5. Where the adaptation bit is '0' it is indicated by the arrow pointing generally down in FIG. 5. The bit in packet 2 is a '1' the sum of this bit and the previous bit is one and so the modulation scheme remains the same. Packet 3 has an adaptation bit which is also '1'. Because the sum of the two consecutive bits is two, the transmitter then determines to switch up to the next higher modulation scheme. After switching, the sum value is reset. The next packet, packet 4, has a '0' adaptation bit but the subsequent packet has an adaptation bit of '1' returning the sum back to an average of zero. The subsequent two packets both have adaptation bits which are '0' such that the sum of two subsequent bits is zero and so the transmitter switches down to the next lower modulation scheme. Again the sum is reset and the process continues as shown in FIG. 5. FIG. 9 is a schematic of a general purpose transceiver of the present invention capable of implementing the process above.

The advantage of this scheme is that if the receiver considers that the modulation scheme used for transmission to itself should be maintained, the bits can be manipulated to prevent the transmitter switching to a higher or even a lower modulation scheme. For example, this can be achieved by alternating the feedback adaptation bit as shown for packets 4 to 6 in FIG. 5. As only one bit is used for sending information back to the receiver and considering that an this information is averaged upon reception, an additional option in the modulation process needs to be specified for cases when conditions are just good enough for maintaining the actual modulation parameters. In this case, the receiver will send information bits back to the transmitter which alternate in value, (i.e. '1's and '0's sequentially) in order to maintain a level that will not indicate that a change to a different scheme is not necessary after analysis of the adapting information at the transmitter.

One advantage of the present invention, apart from minimising the capacity needed for the feedback information per packet, is that it provides an accurate estimate of the ideal modulation scheme in the presence of interference. The present invention can be specifically tailored to be resilient to a specific form of interference and environment. For example, an interferer may be bursty. This can be dealt with by having a high threshold which would avoid unnecessary switching of the modulation scheme. Conversely a rapidly changing environment would require a low threshold to ensure that the switching of the modulation scheme up and down is performed as quickly as possible to provide the optimum scheme.

The system is described above in respect of a single bit of adaptation information in each packet header. However, more than one bit may be included either in the header or as an overhead in the signal data. Similarly, a bit may be included in each segment header.

As indicated above, the present invention is not limited to sending one or several bits of adaptation data as described above. An approach could be used to interpret ARQ information which is implicitly received without the use of the explicit fed-back bits. This threshold approach allows an accurate estimate of the ideal modulation scheme. However, as indicated above, this may introduce latency into the adaptation process because of the time taken to compile the ARQ data. This is mainly because, in order to have an estimation of a whole transmitted packet, the transmitter needs to wait until the state of the last segment transmitted in that packet is known (i.e. whether it has been received correctly or in error) and, according to the distribution of the segment errors, in the worst case scenario the ARQ mapping of the packet in question can take a large number of subsequent packets for doing so. In contrast, the present invention provides a complete estimation of the previous packet ready for the next transmission regardless of number or position of erroneous segments.

The method of generating the adaptation information bit at the receiver will now be described. At the receiver, the segment error rate for every segment is calculated. If errors are found in a segment after CRC checking, '1' will be stored in a temporary variable. Otherwise, a '0' is stored. This information is then summed for each packet and normalised for the total number of segments k, giving ERRi $$ERR_i = \frac{\sum_{n=1}^{k} SER}{k}$$

Given that a desired threshold in throughput is expressed by x and RSSI by R, the bit to be fed back (ERRr) will have one of two possible values after direct comparison.

$$ERRr = \begin{cases} 0 & \text{if } ERR_i < x \text{ \& } RSSI < R \\ 1 & \text{if } ERR_i \geq x \text{ \& } RSSI \geq R \end{cases}$$

Where '$ERR_i \geq x$ & RSSI<'R or '$ERR_i$<x & RSSI$\geq$R' the receiver determines that adaptation should not take place and so the decision bit is sent as alternating values ('1's and '0's) in order to maintain the actual transmission parameters as stated above.

At the transmitter, the received values ($ERR_r$) are summed and divided by the number of chosen packets l (e.g. 2 in the above example and as shown in FIG. 5) in order to get a decision D for adapting.

$$D = \frac{\sum_{n=1}^{l} ERR_r}{l}$$

Upper and lower thresholds are used to determine when to switch up to a higher or lower modulation scheme, e.g. in the example above (where l=2), the modulation scheme is switched to the next higher or lower scheme when D=0 and 1 respectively.

The operation of the specific arrangement of the present invention will now be described. In this arrangement, the communication system is capable of operating according to one of three modulation schemes: DBPSK, DQPSK; and 8DPSK (as was the case in the examples shown in FIGS. 3, 4A and 4B) although other schemes may be used as well as or instead of these. The parameters for these three schemes are as follows:

| System's Parameter | Mode 1 | Mode 2 | Mode 3 |
|---|---|---|---|
| Packet Modulation Scheme | π/2 DBPSK | π/4 DQPSK | D8PSK |
| Header Modulation | π/2 DBPSK | π/2 DBPSK | π/2 DBPSK |
| Maximum Bit Rate | 4 Mbits/sec | 8 Mbits/sec | 12 Mbits/sec |
| Error Detection | CRC (Cyclic Redundancy Check) | | |
| Error Correction | ARQ | ARQ | ARQ |
| Propagation model | Rayleigh | Rayleigh | Rayleigh |
| Bandwidth | 4 MHz | 4 MHz | 4 MHz |

The following table sets out how the transitions from one modulation scheme to the other is determined.

| | Threshold | |
|---|---|---|
| Transition | Normalised Throughput | RSSI |
| DBPSK → DQPSK | >0.90 (DBPSK) | N/A |
| DQPSK → 8DPSK | >0.90 (DQPSK) | >14 dB |
| 8DPSK → DQPSK | <0.72 (8DPSK) | N/A |
| DQPSK → DBPSK | <0.50 (DQPSK) | N/A |

The above table shows how both the segment error rate and RSSI are used to determine the feedback bit as it is sent back to the transmitter. The normalised throughput is determined by measuring the maximum throughput of the system when using a specific modulation scheme and then normalizing this value to 1. After doing this for all the different schemes, a direct relationship between them can be specified for the points where their curves cross (see FIG. 6). For instance, if just 50% of the maximum throughput is achieved when transmitting using DQPSK, an adaptation to DBPSK will give the same throughput but without error in the segments. Thus, reducing the number of retransmissions and increasing the throughput. As is apparent from the table, the measured RSSI value may not be used as a determining factor in all the transitions. In fact, in the table above, it is only used as a check to make sure that it is really appropriate to switch from DQPSK to 8DPSK by ensuring that the RSSI is greater than 14 dB. The reason why this additional safety margin is introduced is explained below with reference to FIG. 6.

Figure 6:
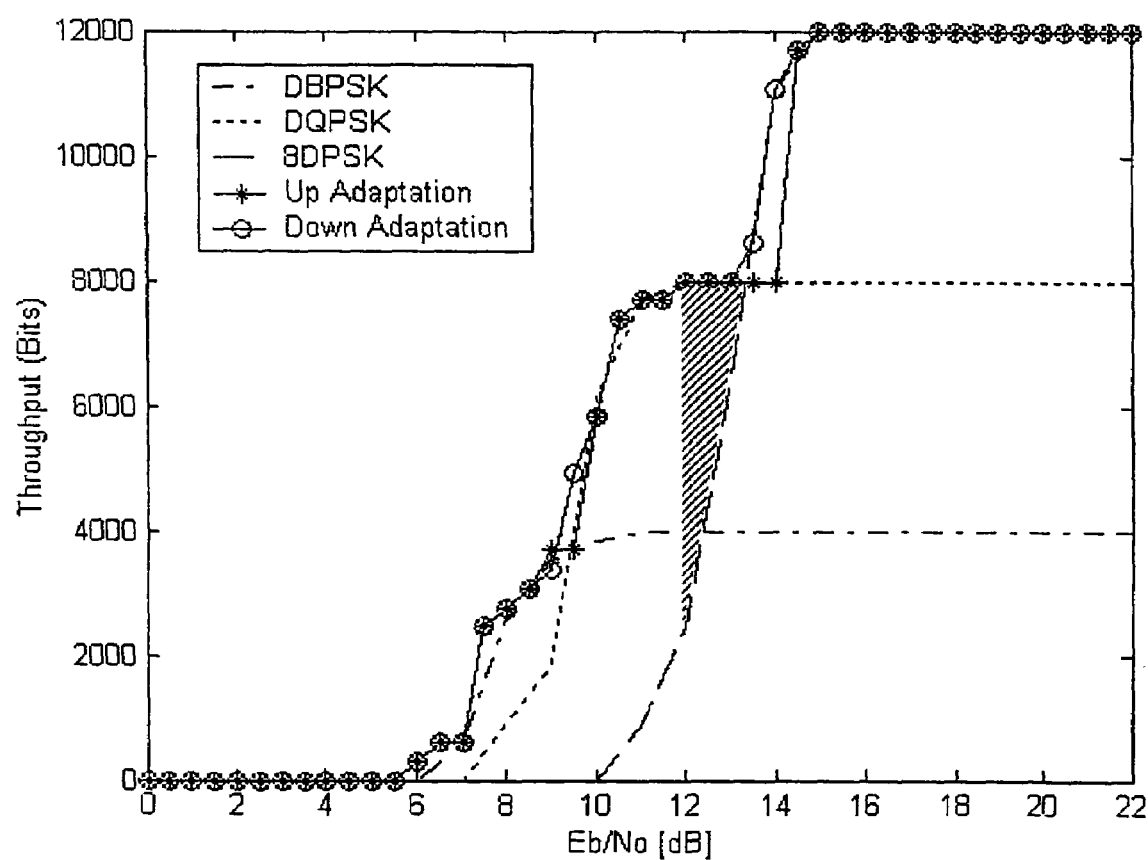
FIG. 6 shows how throughput for various exemplary modulation schemes varies with noise.

FIG. 6 shows the throughput for the three modulation schemes according to the energy to noise ratio. Where the energy to noise ratio is very low, i.e. below about 6 dB, throughput is zero for all three modulation schemes. As $E_b/N_o$ increases the most robust scheme, DBPSK starts to provide some throughput which is shown in the graph. As the $E_b/N_o$ value further increases, the maximum throughput of DBPSK starts to reach its maximum (4000) but the potential throughput for DQPSK quickly begins to exceed that for DBPSK.

At this point (i.e. between 9 dB and 10 dB) the system would switch over to the improved modulation scheme (i.e. DQPSK). As the $E_b/N_o$ increases further, the throughput for DQPSK approaches its maximum value (8000) and soon exceeds the 90% threshold required for switching to 8DPSK. However, because of the RSSI limitation, the system does not switch to 8DPSK until $E_{b/No}$ exceeds 14 dB. The reason for this can be explained by reference to the shaded region in FIG. 6. If the restriction that RSSI is greater than 14 dB was not included, then the system would determine to switch to 8DPSK at a much lower energy to noise, i.e. above about 10 dB. Under these circumstances, the system would switch to 8DPSK which at Eb/No=10 dB has a throughput of 0. This would result in a significant reduction in the throughput, well below that which could be achieved using DQPSK. The 8DPSK modulation scheme provides poorer throughput than DQPSK below about 13 dB. Therefore, in the shaded region, the input would drop substantially such that the system is likely to select a down adaptation at the next step and switch back to DQPSK. This repeated switching between modulation schemes is clearly disadvantageous. This is also the cause of the troughs in throughput shown in FIG. 3.

Figure 7A:
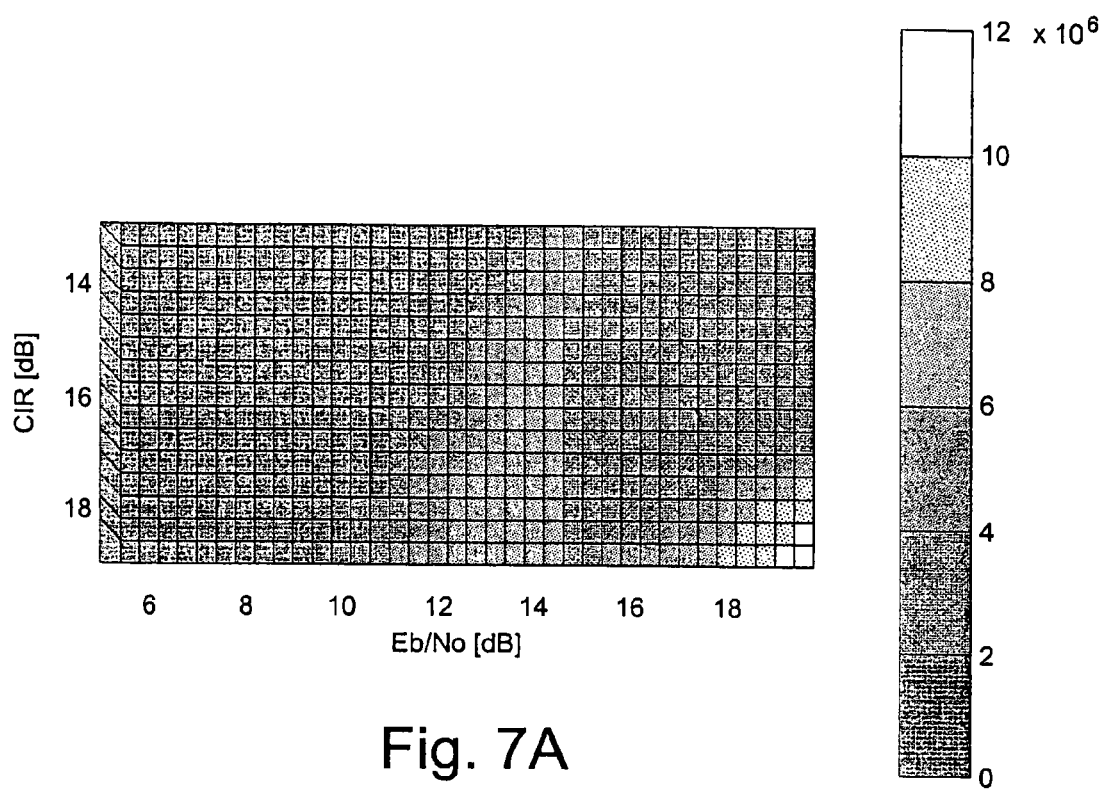
FIGS. 7A and 7B are throughput charts similar to those in FIGS. 4A and 4B but using the adaptive modulation scheme of the present invention.
Figure 7B:
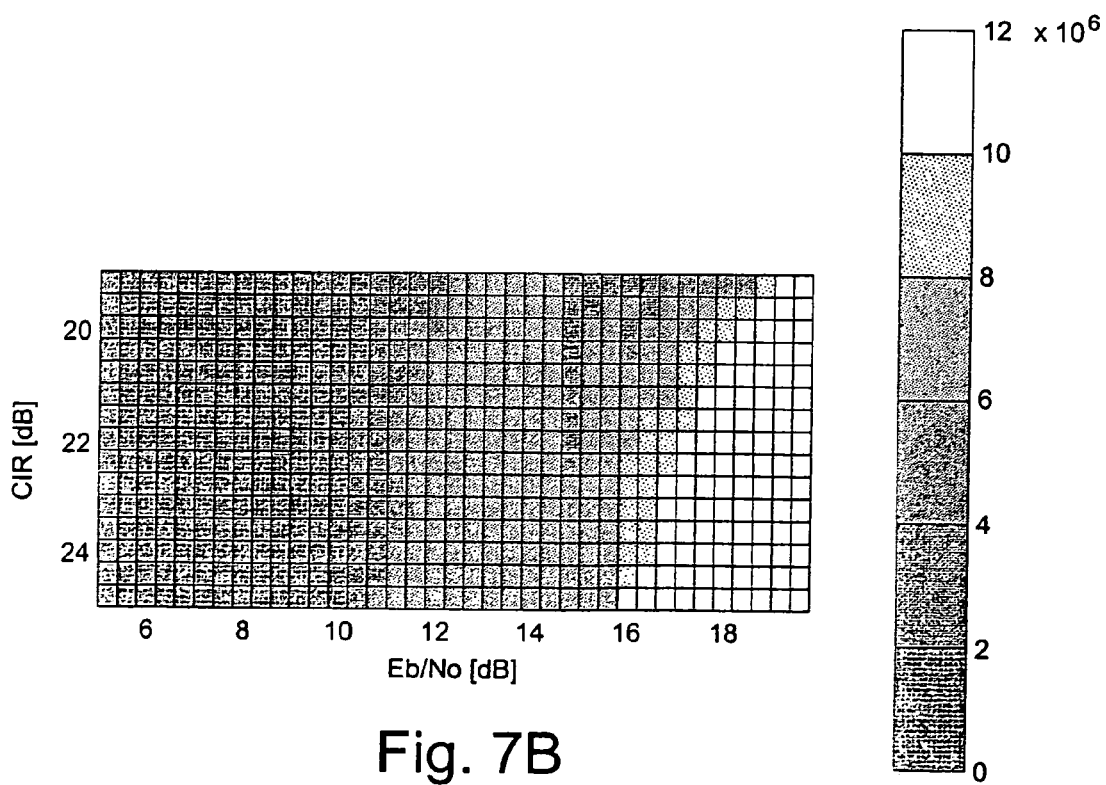

FIGS. 7A and 7B show charts of throughput for the scheme described above where the RSSI threshold test is not used before switching to 8DPSK. The conditions correspond to those for the arrangement shown in FIGS. 4A and 4B where an interfering source is moved towards terminal B and away from terminal A as shown in FIG. 2. The interference received at terminal B progressively increases whereas the interference received at terminal A correspondingly decreases. Comparing the throughput shown in FIGS. 7A and 7B with that in FIGS. 4A and 4B makes it clear that a considerable increase in throughput can be achieved especially where the bit energy to noise energy ratio is in the higher part of the range. By allowing each terminal to determine its own modulation scheme according to the appropriate link, the throughput for each terminal is increased. Looking in the bottom right-hand corner of FIG. 7B, the throughput to terminal A is considerably increased by using 8DPSK, much more than in the implicit method shown in FIG. 4B. Equally, it can be seen that in the top right-hand corner of FIG. 7A the throughput is considerably higher because terminal A is no longer attempting to use too high a modulation scheme. Therefore, because terminal A is sending data using a lower modulation scheme which is more robust and able to deal with the high level of interference, a considerable improvement in data throughput is achieved.

Figure 8A:
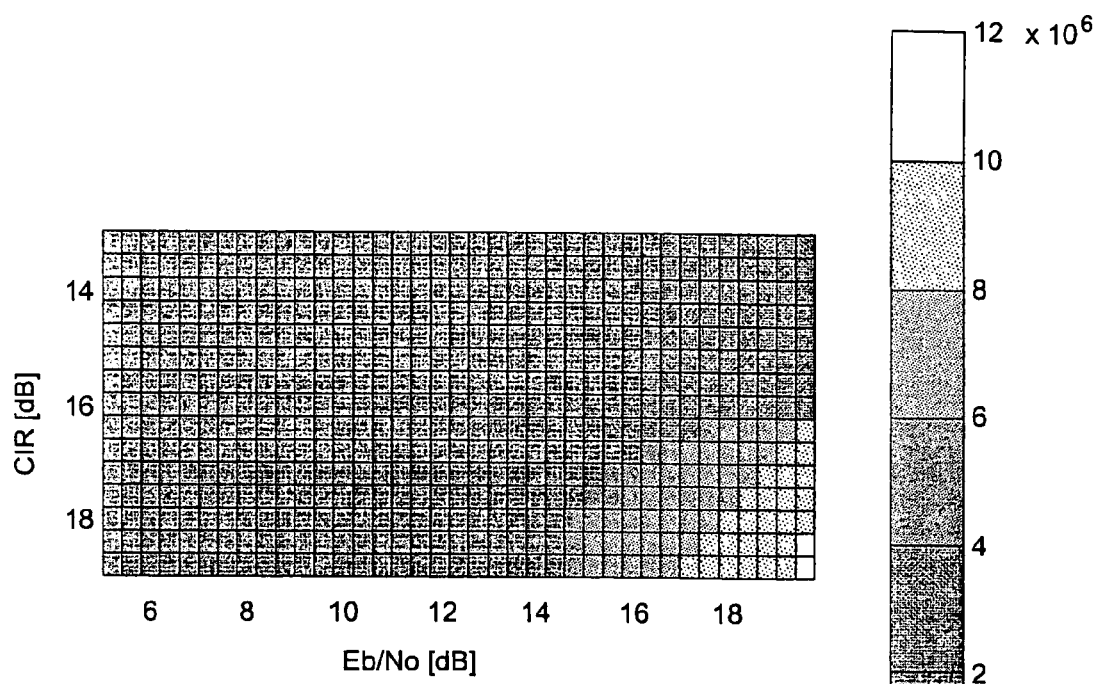
FIGS. 8A and 8B are throughput charts similar to those in FIGS. 4A and 4B but using the adaptive modulation scheme of the present invention and also using RSSI as a metric.
Figure 8B:
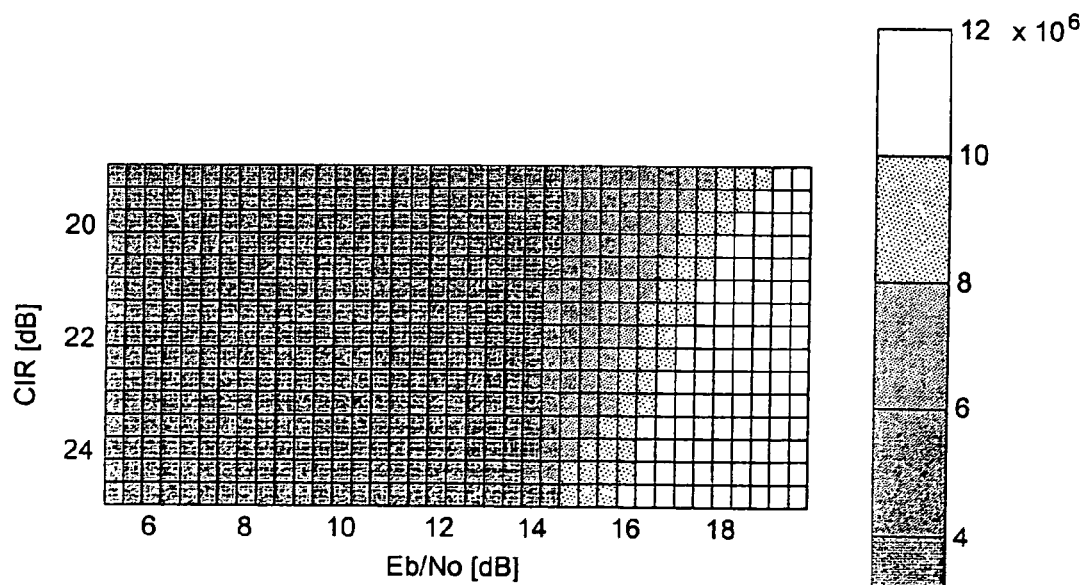

FIGS. 8A and 8B show the throughput response of a system using the method of the present invention but also making use of RSSI as a metric for adaptation. By using RSSI, as described above, the most appropriate point for switching to 8DPSK is determined. In this way repeated switching between 8DPSK and DQPSK is avoided, providing a much more efficient transition point and so higher throughput. This is shown in the throughput charts of FIGS. 8A and 8B where the throughput is considerably increased in the mid-range noise regions. This is achieved by avoiding the inefficient switching from DQPSK to 8DPSK when 8DPSK is not sufficiently robust, with the existing bit energy to noise density ratio, to provide a reasonable throughput such that the system re-adapts to DQPSK. This loss of throughput is avoided in the scheme shown in FIGS. 8A and 8B by only allowing switching to 8DPSK when the bit energy to noise density ratio measured as RSSI exceeds 14 dB.

The arrangement described above provides a system which allows different modulation schemes to be used for each terminal simultaneously such that if the channels do not present reciprocal characteristics, the maximum throughput can be maintained with the modulation scheme appropriate to the conditions of the uplink and downlink respectively.

The present invention also provides a system which is able to adapt rapidly to changes in the environment because it does not have to wait for significant amounts of reference information e.g. using ARQ to be sent from the receiver before it adapts to a more appropriate modulation scheme. Furthermore, the present invention avoids complex calculations having to be carried out because of the simple one bit indication system. Furthermore by using a single bit system for transmitting adaptation information, it is not necessary to utilise valuable data transmission capacity by sending dedicated packets or segments relating to the adaptation information. The single bit can be included in header information in one of the currently unused bits.

The modulation scheme adaptation method of the present invention may be accessed directly by upper layers so as to control the flow of information required by the application running or desired quality of service. For instance, when high reliability in the transmitted information is required, as in the case of a file transfer, a robust modulation scheme might be employed, and for links requiring a higher throughput regardless of some amount of errors, such as in the case of real time video, a modulation scheme conformed by the encoding of a larger number of bits per period of time can be chosen by making a soft change in the parameters for adapting (i.e. increasing or decreasing the values assigned for x and/or RSSI).

The present invention is described in the context of wireless radio communication but it is not intended to be limited to this. The resent invention could be applied to communications taking plate over a hard-wired system or other spectrums than radio frequencies.

The present invention is primarily described in relation to varying the modulation scheme. However, the system can be used to modify other parameters such as the transmission power and the coding rate, as well as the modulation scheme.

We claim:

1. A communication terminal comprising:
   a receiver configured to receive a signal from a sender terminal;
   a signal analyzer configured to determine one or more quality parameters of the received signal;
   an adaptation information generator configured to produce adaptation information based upon said signal quality parameters;
   a transmitter for transmitting data, wherein said data includes the adaptation information and said transmitter is arranged to transmit said adaptation information using one bit of the data included in a header of each of one of more packets of data to be transmitted;
   a modulation scheme adapter responsive to received adaptation information included in said received signal, and configured to determine a modulation scheme for transmission of data from the terminal; and
   a modulator configured to modulate said data according to the determined modulation scheme prior to remission,
   wherein the adaptation information from two consecutive transmissions are added together in determining said modulation scheme.

2. A communication terminal according to claim 1, wherein said generated adaptation information is transmitted as data using one or more bits of data included in the header of each packet of data to be transmitted.

3. A communication terminal according to claim 2, wherein each header includes one bit of said adaptation information.

4. A communication terminal according to claim 1, wherein said generated adaptation information is transmitted as data using one or more bits of data included in the header of each packet of data to be transmitted.

5. A communication terminal according to claim 4, wherein each header includes one bit of said adaptation information.

6. A communication terminal according to claim 1, wherein:
   said quality parameters include one or more of: automatic repeat request (ARQ) data in the received signal;
   the segment error rate (SER) of the received signal; the received signal strength (RSSI);
   the carrier to inference ratio (C/I) of the received signal; and
   the carrier signal strength of the received signal and the interference signal strength (ISSI) in the received signal.

7. A communication terminal according to claim 6, wherein said quality parameters include at least the segment error rate (SER) of the received signal and the received signal strength (RSSI).

8. A communication terminal according to claim 1, wherein said received adaptation information comprises one or more bits of data extracted from the headers of received packets of data.

9. A communication terminal according to claim 8, wherein each header includes one bit of said received adaptation information.

10. A communication terminal according to claim 3, wherein said one bit is put in an unused slot in the header.

11. A communication terminal according to claim 5, wherein said one bit is put in an unused slot in the header.

12. A communication terminal according to claim 1 wherein said modulation schemes include at least two of DBPSK, DQPSK and 8DPSK.

13. A communication system comprising two terminals, each terminal comprising:
- a receiver configured to receive a signal from a sender terminal;
- a signal analyzer configured to determine one or more quality parameters of the received signal;
- an adaptation information generator configured to produce adaptation information based upon said signal quality parameters; and
- a transmitter configured to transmit data,
- wherein said data includes the adaptation information,
- wherein said generated adaptation information is transmitted as data using one or more bits of data included in the header of each packet of data to be transmitted, each header includes one bit of said adaptation information,
- in response to received adaptation information included in said received signal, a modulation scheme for transmission of data from the terminal is determined by adding together the adaptation information from two consecutive transmissions.

14. A communication terminal comprising:
- a receiver configured to receive a signal from a sender terminal;
- a modulation scheme adapter responsive to received adaptation information included in said received signal, and configured to determine a modulation scheme for transmission of data from the terminal;
- a modulator configured to modulate said data according to the determined modulation scheme; and
- a transmitter configured to transmit said modulated data,
- wherein said received adaptation information comprises one or more bits of data extracted from the headers of received packets of data, and
- in response to received adaptation information included in said received signal, a modulation scheme for transmission of data from the terminal is determined by adding together the adaptation information from two consecutive transmissions.

15. A communication terminal according to claim 14, wherein each header includes one bit of said received adaptation information.

16. A communication terminal according to claim 15, wherein said one bit is put in an unused slot in the header.

17. A communication terminal according to claim 14, wherein said modulation schemes include at least two of DBPSK, DQPSK and 8DPSK.

18. A communicationsystem comprising two terminals, each terminal comprising:
- a receiver configured to receive a signal from a sender terminal;
- a modulation scheme adapter responsive to received adaptation information included in said received signal, and configured to determine a modulation scheme for transmission of data from the terminal;
- a modulator configured to modulate said data according to the determined modulation scheme; and
- a transmitter configured to transmit said modulated data,
- wherein said received adaptation information comprises one or more bits of data extracted from the headers of received packets of data, and
- in response to received adaptation information included in said received signal, a modulation scheme for transmission of data from the terminal is determined by adding together the adaptation information from two consecutive transmissions.

19. A method of communication comprising:
- receiving a signal;
- determining one or more quality parameters of the received signal;
- generating adaptation information based upon said signal quality parameters; and
- transmitting signal data including said adaptation information as data using one bit of data included in a header of each of one of more packets of signal data.
- wherein, in response to received adaptation information included in said received signal, a modulation scheme for transmission of data from the terminal is determined by adding together the adaptation information from two consecutive transmissions.

20. A method according to claim 19, wherein said generated adaptation information is transmitted as data using one or more bits of data included in the header of each packet of signal data to be transmitted.

21. A method according to claim 20, wherein each header includes one bit of said adaptation information.

22. A method according to claim 19, further comprising:
- determining a modulation scheme for transmission of said signal data in response to received adaptation information included in said received signal; and
- modulating said signal data according to the determined modulation scheme prior to transmission.

23. A method according to claim 22, wherein said generated adaptation information is transmitted as data using one or more bits of data included in the header of each packet of signal data to be transmitted.

24. A method according to claim 23, wherein each header includes one bit of said adaptation information.

25. A method according to claim 19, wherein said quality parameters include one or more of: automatic repeat request (ARQ) data in the received signal; the segment error rate (SER) of the received signal; the received signal strength (RSSI); the carrier to inference ratio (C/I of the received signal; carrier signal strength of the received signal and interference signal strength (ISSI) in the received signal.

26. A method according to claim 25 wherein said quality parameters includes at least the segment error rate (SER) of the received signal and the received signal strength (RSSI).

27. A method according to claim 22, wherein said received adaptation information comprises one or more bits of data extracted from the headers of received packets of data.

28. A method according to claim 22, wherein each header includes one bit of said received adaptation information.

29. A method according to claim 22, wherein said one bit is put in an unused slot in the header.

30. A method according to claim 24, wherein said one bit is put in an unused slot in the header.

31. A method according to claim 19 wherein said modulation schemes include at least two of DBPSK, DQPSK and 8DPSK.

32. A carrier medium carrying computer readable instructions for controlling a computer to carry out the method of claim 19.

33. A method of communication comprising:
receiving a signal;
determining a modulation scheme for transmission of said signal data in response to received adaptation information included in said received signal;
modulating said signal data according to the determined modulation scheme prior to transmission; and
transmitting said signal data including said adaptation information as data using one bit of data included in a header of each of one of more packets of signal data,
wherein, in response to received adaptation information included in said received signal, a modulation scheme for transmission of data from the terminal is determined by adding together the adaptation information from two consecutive transmissions.

34. A method according to claim 33, wherein said received adaptation information comprises one or more bits of data extracted from the headers of received packets of data.

35. A method according to claim 33 wherein said modulation schemes include at least two of DBPSK, DQPSK and 8DPSK.

36. A method according to claim 35, wherein said one bit is put in an unused slot in the header.

37. A carrier medium carrying computer readable instructions for controlling a computer to carry out the method of claim 33.

* * * * *